United States Patent Office 3,450,756
Patented June 17, 1969

3,450,756
BROMINATION PROCESS OF SALICYLANILIDE
Vincent Lamberti, Upper Saddle River, and Henry Lemaire, Leonia, N.J., assignors to Lever Brothers Company, New York, N.Y., a corporation of Maine
No Drawing. Filed June 8, 1967, Ser. No. 644,479
Int. Cl. C07c *103/20*
U.S. Cl. 260—559                                    8 Claims

ABSTRACT OF THE DISCLOSURE

A process for the bromination of one mole of salicylanilide with about three to about four moles of bromine which utilizes a very dilute aqueous acid stable organic surfactant reaction medium containing an appreciable amount of a water-soluble inorganic bromide salt in order to produce a light colored germicidal mixture of reaction products rich in 3,4′,5-tribromosalicylanilide and low in undesirable 3,5-dibromosalicylanilide and 2′,3,4′,5-tetrabromosalicylanilide.

---

The present invention relates to a bromination process and more particularly to a process for the bromination of salicylanilide to produce a mixture of the brominated derivatives of salicylanilide composed predominantly of 3,4′,5-tribromosalicylanilide using a novel reaction medium.

Heretofore, a variety of reaction media have been used in the bromination of salicylanilide with liquid bromine. Typical examples of such reaction media include aqueous benzene, aqueous chlorinated hydrocarbons, aqueous paradioxane, aqueous alcohol, aqueous acetic acid and aqueous surfactants (U.S. Patent Nos. 2,997,502, 3,057,920, 3,064,048, 3,149,156, 3,149,157 and 3,152,177). The use of such reaction media in the bromination of salicyanilide with liquid bromine results either in the production of a predominant amount of 4′,5-dibromosalicylanilide or a predominant amount of 3,4′,5-tribromosalicylanilide depending upon the nature of the reaction medium employed.

A reaction medium utilized heretofore in the bromination of salicylanilide with aqueous bromine which is of particular interest is an aqueous surfactant solution comprising 99.9–98% of water and 0.1–2% of an organic surfactant. Such a reaction medium, however, is disadvantageous in that the brominated salicylanilide products contain only 70–80% of desirable 3,4′,5-tribromosalicylanilide and further contain excessive amounts of undesirable components, namely 12–18% of 3,5-dibromosalicylanilide which has low germicidal activity and low skin substantivity and 3–15% of 2′,3,4′,5-tetrabormosalicylanilide which is a photosensitizer and hence causes skin rash.

Therefore, it is the object of the present invention to provide a process for the preparation of a light-colored mixture of brominated derivatives of salicylanilide in very high yield composed predominantly, i.e., at least about 85% by weight, of 3,4′,5-tribromosalicylanilide and being low in undesirable 3,5-dibromosalicylanilide content, namely from about 0.4% to about 2.3% by weight thereof, and low in undesirable 2′,3,4′,5-tetrabromosalicylanilide content, namely from about 0.5% to about 2.3% by weight thereof, by utilizing a novel very dilute aqueous acid stable organic surfactant reaction medium containing an appreciable amount of water-soluble inorgnic bromide salt.

In accordance with the process of the invention 1 mole of salicylanilide is brominated with about 3 to about 4 mols of liquid bromine in a reaction medium made up of from about 99.99% to about 99.9% by weight of water and from about 0.01% to about 0.1% by weight respectively of an acid stable organic surfactant, the reaction medium further containing a water-soluble inorganic bromide salt in an amount sufficient to provide at least 4 moles of bromide ion per liter of reaction medium.

Salicylanilide is insoluble in the reaction medium at reaction temperatures. Stirring therefore is essential throughout the reaction in order to keep the system uniform. Enough of the reaction medium should be used to ensure complete suspension of the salicylanilide, but apart from this the amount is in no way critical. The larger the volume of the reaction medium, the more difficult the mix is to handle and the more dilute will be the suspension, so that the reaction will proceed more slowly. A reaction medium having a concentration of less than about 5% salicylanilide thus would not normally be used. At a concentration in excess of about 12% the reaction mixture becomes quite thick and difficult to stir. Generally a concentration of from about 8% to about 10% is employed.

The reaction proceeds smoothly at a temperature within the range from about 40° C. to about 70° C. Generally from about 50° C. to about 65° C. or slightly higher is employed, since at the more elevated temperatures the color of the product may be dark. At temperatures below 40° C. reaction proceeds too slowly to be practical.

The bromine can be added either rapidly, for example within about 5 minutes, or it can be added dropwise or in small increments over a period of from about ½ to 3 hours. After all the bromine has been added, the reaction mixture is held at the reaction temperature for sufficient time to allow the reaction to proceed to completion, usually in about ½ to 3 hours' time. The reaction mixture then can be cooled to room temperature or lower and is filtered to remove the desired product which is insoluble in the reaction medium.

Any acid stable organic surfactant can be employed. The anionic, cationic and nonionic surfactants are the best known classes of surfactants and any of these, alone or in admixture, give satisfactory results. Numerous representative examples of such acid stable organic surfactants which can be employed in the reaction medium of the process of the present invention are fully described in the above-mentioned U.S. Patent No. 3,064,048, which disclosure is incorporated by reference herein.

Those water-soluble inorganic bromide salts having sufficient water-solubility to provide at least 4 moles of bromide ion per liter of reaction medium include the lithium, sodium, potassium, calcium, magnesium, strontium, zinc and aluminum bromides.

The process of the invention will be illustrated by the following examples.

EXAMPLES 1–3

One mole (213 grams) of salicylanilide was suspended in 3,600 grams of water containing 0.4 gram of sodium dodecylbenzene sulfonate (Examples 1 and 2) or containing 4 grams of sodium linear alkyl ($C_{10}$–$C_{14}$) secondary benzene sulfonate (Example 3). This aqueous surfactant solution was made 9.7 molar (Examples 1 and 2) or 4.4 molar (Example 3) with respect to bromide ion content (sodium bromide). The suspension was heated to 65–70° C. 3.8 moles (608 grams) of liquid bromine (Examples 1 and 2) or 3.5 moles (560 grams) of liquid bromine (Example 3) was then added dropwise over a 60-minute period in Example 1 and added rapidly in one minute in Examples 2 and 3 while stirring and maintaining the temperature of the suspension at 65–70° C. The product was aged for one hour and 45 minutes in Example 1 and for two hours and 45 minutes in Examples 2 and 3 at 65–70° C. before quick cooling to 11° C. The product was then filtered, washed twice with methanol and dried.

The total yield and analyses of the light colored (cream) brominated salicylanilide products were as set forth in the following table. The isomer distribution in the products of Examples 1, 2 and 3 was determined by a combination of ion-exchange column chromatography and ultraviolet absorption analysis.

The Control Example in the following table illustrates the disadvantageous comparative data obtained, as discussed above, when the reaction medium does not contain a water-soluble inorganic bromide salt, such as the representative sodium bromide used in Examples 1–3.

ISOMER DISTRIBUTION (PERCENT)

| Example No. | Total yield (percent) | 3,5 | 4',5 | 3,4',5 | 2',3,4',5 | Other minor components |
|---|---|---|---|---|---|---|
| 1 | 98 | 2.3 | 6.2 | 88.2 | 0.5 | 2.8 |
| 2 | 98 | 0.4 | 6.8 | 88.0 | 2.3 | 2.5 |
| 3 | 99 | 1.5 | 5.8 | 87.5 | 2.0 | 3.2 |
| Control | | 12–18 | | 70–80 | 3–15 | |

In the above examples run in laboratory scale equipment an excess of bromine reactant was required partly because of the significant mechanical losses that occur on the laboratory scale and also because the bromide ions apparently complex or diminish the reactivity of the bromine added. Any excess bromine can be recovered from the bromide-bromine mother liquor either by heating or simply by neutralizing the hydrobromic acid present to form additional sodium bromide and then recycling the solution for another bromination reaction. In plant equipment, on the other hand, the reactants normally approach stoichiometric quantities.

The mixed brominated derivatives of salicylanilide containing a predominant amount of 3,4',5-tribromosalicylanilide are well known to the utilizable as germicides in a variety of compositions, such as soaps.

It will be appreciated that various modifications and variations may be made in the process of the invention, in addition to those set forth above, by those skilled in the art without departing from the spirit of the invention and that accordingly the invention is to be limited only within the scope of the appended claims.

What is claimed is:

1. A process of preparing a mixture of brominated derivatives of salicylanilide composed predominantly of 3,4',5-tribromosalicylanilide and being low in 3,5-dibromosalicylanilide content and being low in 2',3,4',5-tetrabromosalicylanilide content which comprises brominating at a temperature from about 40 °C. to about 70° C. 1 mole of salicylanilide with about 3 to about 4 moles of bromine in a reaction medium consisting essentially of 99.99% to about 99.9% by weight of water and about 0.01% to 0.1% by weight respectively of an acid stable organic surfactant, said reaction medium further containing a water-soluble inorganic bromide salt in an amount sufficient to provide at least 4 moles of bromide ion per liter of reaction medium, said water-soluble inorganic bromide salt being selected from the group consisting of lithium, sodium, potassium, calcium, magnesium, strontium, zinc, and aluminum bromides.

2. The process in accordance with claim 1 wherein the bromine is added dropwise.

3. The process in accordance with claim 1 wherein the bromine is added rapidly.

4. The process in accordance with claim 1 wherein the surfactant is anionic.

5. The process in accordance with claim 4 wherein the surfactant is an alkylaryl sulfonate.

6. The process in accordance with claim 5 wherein the surfactant is sodium dodecylbenzene sulfonate.

7. The process in accordance with claim 5 wherein the surfactant is sodium linear alkyl ($C_{10}$–$C_{14}$) secondary benzene sulfonate.

8. The process in accordance with claim 1 wherein the water-soluble inorganic bromide salt is sodium bromide.

References Cited

UNITED STATES PATENTS 3,064,048  11/1962  Schramm et al. _____ 260—559

NORMA S. MILESTONE, *Primary Examiner.*

HARRY I. MOATZ, *Assistant Examiner.*

U.S. Cl. X.R.

260—999